US012809008B2

(12) United States Patent
Reimann

(10) Patent No.: US 12,809,008 B2
(45) Date of Patent: Nov. 24, 2026

(54) METHOD FOR DETERMINING A DISTANCE USING A HIGH-RESOLUTION METHOD BASED ON SIGNAL PROPAGATION TIME MEASUREMENTS

(71) Applicant: Lambda:4 Entwicklungen GmbH, Hamburg (DE)

(72) Inventor: Rönne Reimann, Hamburg (DE)

(73) Assignee: Lambda:4 Entwicklungen GmbH, Hamburg (DE)

( * ) Notice: Subject to any disclaimer, the term of this patent is extended or adjusted under 35 U.S.C. 154(b) by 405 days.

(21) Appl. No.: 18/250,882

(22) PCT Filed: Nov. 3, 2021

(86) PCT No.: PCT/EP2021/080518
§ 371 (c)(1),
(2) Date: Apr. 27, 2023

(87) PCT Pub. No.: WO2022/096509
PCT Pub. Date: May 12, 2022

(65) Prior Publication Data
US 2023/0393253 A1 Dec. 7, 2023

(30) Foreign Application Priority Data
Nov. 4, 2020 (WO) ................. PCT/EP2020/081013

(51) Int. Cl.
*G01S 11/08* (2006.01)
*G01S 11/06* (2006.01)

(52) U.S. Cl.
CPC ............... *G01S 11/08* (2013.01); *G01S 11/06* (2013.01)

(58) Field of Classification Search
CPC ................................ G01S 11/08; G01S 11/06
(Continued)

(56) References Cited

U.S. PATENT DOCUMENTS 6,489,923 B1 12/2002 Bevan
2002/0008615 A1 1/2002 Heide et al.
(Continued)

FOREIGN PATENT DOCUMENTS

DE 112014004426 6/2016
EP 0664625 7/1995
(Continued)

OTHER PUBLICATIONS

Synchronization in Wireless Sensor Networks using Bluetooth, Casas et al., Third International Workshop on Intelligent Solutions in Embedded Systems, 2005., ISBN: 3-90246303-1, May 1, 2005.

*Primary Examiner* — Whitney Moore
(74) *Attorney, Agent, or Firm* — Sand, Sebolt & Wernow Co., LPA

(57) ABSTRACT

The invention relates to a method for determining a distance using a high-resolution method based on signal propagation time measurements. The process of determining distances from wireless signals with a high degree of precision using mathematical methods is known, for example using MUSIC or CAPON or methods such as those from EP 3 564 707, EP 3 502 736 A1, or EP 2 212 705. These methods, however, normally require phase measurements. The aim of the invention is to allow such methods to be used even purely with propagation time measurements. This is achieved in that complex numbers are constructed from propagation time measurements and amplitude mea-surements or power mea-surements, said complex numbers allowing the use of known methods.

13 Claims, 1 Drawing Sheet

(58) Field of Classification Search
USPC .................................... 342/458, 59; 367/127
See application file for complete search history.

(56) References Cited

U.S. PATENT DOCUMENTS

| | | | | |
|---|---|---|---|---|
| 2012/0019413 | A1 | 1/2012 | Fretenburg | |
| 2012/0133544 | A1* | 5/2012 | Rudd | G01S 15/101 367/127 |
| 2012/0320335 | A1* | 12/2012 | Weeber | A61F 2/1654 351/159.01 |
| 2014/0320335 | A1 | 10/2014 | Lee | |
| 2019/0238789 | A1* | 8/2019 | Tanaka | H04N 5/04 |
| 2020/0099561 | A1* | 3/2020 | Lee | H04L 27/265 |
| 2020/0118372 | A1 | 4/2020 | Stitt et al. | |
| 2023/0213647 | A1* | 7/2023 | Rappaport | H01Q 3/26 342/59 |

FOREIGN PATENT DOCUMENTS

| | | | |
|---|---|---|---|
| EP | 1650581 | | 4/2006 |
| EP | 2212705 | | 8/2010 |
| EP | 2232705 | A1 | 9/2010 |
| EP | 2525238 | | 11/2012 |
| EP | 2710398 | | 3/2014 |
| EP | 3502736 | | 6/2019 |
| EP | 3564703 | | 11/2019 |
| EP | 3564706 | | 11/2019 |
| EP | 3564707 | | 11/2019 |
| WO | 2009067997 | | 6/2009 |
| WO | 2010025273 | | 3/2010 |
| WO | 2012155993 | | 11/2012 |
| WO | 2014130196 | | 8/2014 |
| WO | 2019238789 | | 12/2019 |
| WO | 2020060686 | | 3/2020 |
| WO | 2020156939 | | 8/2020 |
| WO | 2020165134 | | 8/2020 |
| WO | 2022016161 | | 1/2022 |
| WO | 2022096091 | | 5/2022 |
| WO | 2022096510 | | 5/2022 |
| WO | 2022096511 | | 5/2022 |
| WO | 2022096512 | | 5/2022 |
| WO | 2022096513 | | 5/2022 |
| WO | 2022096514 | | 5/2022 |
| WO | 2022096515 | | 5/2022 |

* cited by examiner

METHOD FOR DETERMINING A DISTANCE USING A HIGH-RESOLUTION METHOD BASED ON SIGNAL PROPAGATION TIME MEASUREMENTS

TECHNICAL FIELD

The invention relates to a method for determining a distance using a high-resolution method based on signal time-of-flight measurements.

BACKGROUND ART

Determining distances with a high degree of accuracy from radio signals by means of mathematical methods is known, such as, for example, by means of MUSIC or CAPON, or as known from EP 3 564 707, EP 3 502 736 A1 or EP 2 212 705.

These methods, however, normally require phase measurements. The problem which the invention seeks to solve is to allow such methods to be used even purely with time-of-flight measurements.

SUMMARY OF THE INVENTION

This is solved in that complex numbers are constructed from time-of-flight measurements and amplitude measurements, and/or time-of-flight measurements and power measurements, said complex numbers enabling the application of known methods.

The problem is also solved by a method for distance determination between two objects on the basis of a plurality of radio signal time-of-flight measurements at a plurality of different frequencies between the two objects.

The problem is also solved by the use of phase values obtained computationally from signal time-of-flight measurements between two objects at different frequencies for the different frequencies, and/or arguments of complex numbers for the different frequencies, for determining a spacing between the two objects by means of phase-based spacing calculation methods and/or spacing calculation methods based on complex numbers.

Constructing or obtaining the phase values, or arguments of the complex numbers, from a signal time-of-flight, particularly pulse time-of-flight (ToF), and their measurement, instead of a phase measurement, is thus done solely based on pure time-of-flight measurements, particularly pulse time-of-flight measurements or ToF measurements. The complex number is obtained, in particular, solely on the foundation of time-of-flight measurements, particularly pulse time-of-flight measurements or ToF measurements, as well as amplitude measurements and/or time-of-flight measurements, particularly pulse time-of-flight measurements or ToF measurements and power measurements. Phase measurements are thus, in particular, not necessary for constructing, determining, or computationally obtaining, the complex numbers. In particular, phase measurement of a radio signal is not used for computationally obtaining the complex number and/or for computationally obtaining the phase values.

Preferably, at least one first radio signal with a plurality of different frequencies is sent from a first object to a second, and received at the second object. Preferably, a part or all of the radio signal time-of-flight measurements are performed on this at least one first radio signal. In a bidirectional embodiment, too, at least one second radio signal with a plurality of different frequencies is sent from the second object to the first object, and received at the first object. Preferably, a part or all of the radio signal time-of-flight measurements are performed on this at least one second radio signal. In particular, the radio signal time-of-flight measurements are performed on the at least one first radio signal and the at least one second radio signal. In particular, the radio signal time-of-flight measurements are performed on radio signal components that have different frequencies. In particular, the at least one first radio signal and the at least one second radio signal form the at least one radio signal. In particular, at least one radio signal time-of-flight measurement is performed for each frequency of the at least one radio signal.

In particular, an amplitude and/or power measurement is also performed on the at least one radio signal for every radio signal time-of-flight measurement, and/or on a similar signal component and/or, in temporal proximity to each radio signal time-of-flight measurement.

Preferably, at least one of the two objects has means for sending the at least one radio signal, particularly means for generating the signal, means for amplifying the signal, and/or means for emitting the signal, particularly at least one antenna. In addition to that, for this purpose, at least the other of the two objects has means for receiving and measuring the at least one radio signal, particularly at least one antenna, and/or means for amplifying the received radio signal, and/or means for determining the amplitude and/or power of the radio signal. In particular, the objects together have means for time-of-flight measurement. For this purpose, particularly both objects have timers or clocks, and the objects are particularly configured for aligning and/or comparing and/or synchronizing the clocks or timers.

The method according to the invention is particularly characterized in that phase values for different frequencies, and/or arguments of complex numbers, are determined for different frequencies based on the radio signal time-of-flight measurements. This is done computationally, in particular.

Phase values for different frequencies, and/or arguments of complex numbers for different frequencies, are distinguished particularly in that, as phase measurement values or complex numbers, they can be used in mathematical methods for phase-based distance determination, particularly previously known such methods, for determining a distance between the two objects. In a preferred embodiment, the method also contains its use in mathematical methods for phase-based spacing determination, particularly previously known such methods, for determining a spacing between the two objects and, particularly also, calculating the spacing.

Especially advantageously, amplitude and/or power measurements at the plurality of different frequencies are performed for the plurality of radio signal time-of-flight measurements, wherein a number that is proportional to the amplitude or power can be, or is, used as amplitude or amount of the complex number in mathematical methods for phase-based distance determination, particularly known such methods, or for mathematical methods based on complex numbers, in order to determine a distance between the two objects. This approach broadens the possible applications of the method.

Radio signal times-of-flight of radio signal time-of-flight measurements are preferably used for frequencies, particularly adjacent ones of the plurality of different ones, for calculating a phase shift difference scaled to the spacing of the frequencies of the measurements of the radio times-of-flight. Preferably, the respective argument of the complex number at a frequency and/or the phase value at a frequency is taken as the summed phase shift difference up to this frequency, weighted by the frequency spacing.

Preferably, for radio signal time-of-flight measurement, at least one radio signal with the plurality of different frequencies is sent from a first of the two objects to a second of the two objects, and/or vice versa, wherein there is phase-coherent switching between particularly at least two of the plurality of different frequencies, and/or switching such that the phase jump is known and/or measured at the transmitter. Preferably, not only the sending object switches phase-coherently, but rather also the receiving object does so, particularly a PLL is switched phase-coherently in each object. The phase difference or phase jump when switching between two frequencies generally arises due to technical reasons, but can also be prevented. The switching between two frequencies can be carried out with a short interruption or interruption-free. At the time of the interruption-free change, the phase jumps, or during the change with interruption, the phase of the signals theoretically imagined to continue during the interruption, jumps before and after switching. A defined phase jump exists at the change time-point without interruption, or at a theoretical change time-point during the interruption, particularly in the middle of the interruption and/or at the end of the signal before the interruption or at the beginning of the signal after the interruption. This is the phase difference.

Phase-coherent switching or changing between two frequencies is understood to mean, particularly, that the phase after the switching is known relative to the phase position before the switching. This is the case when the change of phase when switching is zero, or is a previously known or ascertainable value. In this manner, further measurements of the phase at the transmitter can be avoided, and the calculation can be simplified, particularly when frequencies are switched between without phase change. Alternatively, switching does not have to be phase-coherent, and the change in phase can be determined locally, i.e., particularly at the transmitter before the transmission and/or at the receiver relative to the PLL of the receiver, and this change can be corrected in the calculation.

Advantageously, the method can be conducted as one-sided in some applications, which is a big advantage compared to originally phase-based measurements, which normally have to be done by bidirectional exchange. Thus it can be preferred that the radio signal time-of-flight measurements used for the method according to the invention are only carried out on radio signals that are sent by a first of the two objects and received at a second of the two objects. The decision as to which radio signals [should be used for the time-of-flight measurements], namely those sent from the first or from the second [object], can be part of the method, and is executed particularly such that the signals received with less interference are used. The decision can also be made separately for frequencies or frequency ranges. The decision can be made before or after the partial or complete transmission of the radio signals from the first to the second, and/or from the second to the first, object.

In certain scenarios, it is advantageous for the method to be conducted such that the second object does not send any signals for distance determination, and/or the second object sends signals only for time- and/or clock-cycle-synchronization, or is passive except for the time- and/or clock-cycle-synchronization.

Especially advantageously, the method is conducted such that the first and/or second of the two objects emits the multiple frequencies successively and/or consecutively, particularly directly consecutively, and/or wherein the bandwidth of the signals never exceeds 50 MHz, particularly 25 MHz. This allows simple components to be used and interference to be minimized.

Especially preferably, at least one time- and/or clock-cycle- and/or time drift-synchronization and/or -correction is carried out between the two objects before, after, and/or during the execution of the method. This augments the accuracy. Advantageously, a time drift, and/or a time drift difference, of the two objects at least of one of the two objects is determined, and/or corrected, and/or considered, in calculating the distance.

Especially advantageously, the frequency spacing between two consecutive frequencies of the different frequencies is selected with at least 0.1 MHz and/or a maximum of 17 MHz, particularly a maximum of 10 MHz, and/or the number of the different frequencies is at least five frequencies and/or a maximum of 200 frequencies and/or the different frequencies span a frequency band of at least two MHz and/or a maximum of 100 MHz. In practice, this has been revealed as sufficient for high accuracies and, on the other hand, requires only structures of low complexity and only reasonable frequency bands.

Advantageously, radio signals received at the second or first object with a received power below a predetermined and/or ascertained lower power limit, particularly ascertained from or in consideration of the received radio signals, are left unconsidered in the spacing determination, in particular, such radio signals as lie more than 50% below the mean power of the received radio signals remain unconsidered. Alternatively or additionally, radio signals received at the second or first object with a power above a predetermined and/or ascertained upper lower limit, particularly ascertained from or in consideration of the received radio signals, are left unconsidered for the distance determination.

In another embodiment, of the signals, particularly those selected in the decision, the x % signals with the smallest received amplitude are sorted out and not used, and/or the y % signals with the largest received amplitude are sorted out and not used. It has been shown to be especially advantageous when the sum of x and y does not exceed and/or does not fall below 75, and/or x lies in the range from 10 to 75, and/or y lies in the range from 20 to 50. In most situations, a high degree of accuracy and a reliable spacing determination can be achieved with these values.

In response to a corresponding request, the method, advantageously, is conducted such that the method is carried out between a plurality of pairs of objects, wherein particularly one object of each pair is an object that is involved in all other pairs, and wherein the ascertained distances of the pairs are used to carry out a mapping and/or position determination.

Advantageously, for each radio signal received at the second and/or first object, a value proportional to its amplitude or power, and a phase value, are determined, and from them, in particular, a complex number is determined in each case which is used for the distance determination between the first and the second object.

The phase value or argument is determined particularly in that a phase shift change scaled to a frequency spacing is calculated in each case with regard to a plurality of pairs of the radio signals with, particularly adjacent, frequency, thus the derivation of the phase shift is calculated approximately on one of the frequencies, or on the frequencies, of the pairs. For this purpose, first, the phase shift for the frequencies of the respective pair is calculated from the signal time-of-flight, which is possible directly via the relationship between frequency and wavelength and propagation speed, for example, via the relationship:

$$\text{Phase shift}=2Pi*(2*\text{Distance})*\text{Frequency}/c$$

$$RTT=2*\text{Distance}/c$$

And following from that:

$$\text{Phase shift}=2Pi*(RTT*c)*\text{Frequency}/c$$

The phase shift is a phase shift upon transmission at the frequency from one object to the other, and back, which occurs as a result of the distance. It can be approximately equated with double the phase shift that occurs upon transmission at the frequency from one object to the other as a result of the distance.

Then, or skipping this step, the preferably (scaled) phase shift changes (dPhase shift) are determined between two adjacent frequencies, for example, using $$\text{dPhase shift}(f1,f2)=Pi*(RTT*c)*\text{dFrequency}(f1,f2)/c$$

The doubled signal time-of-flight or the signal round-trip time between the first and the second object at a frequency similar to the frequencies f1 and/or f2 can be used as RTT, without an averaging of signal times-of-flight at similar frequencies.

Frequencies are regarded as similar particularly when they differ from one another by less than 17 MHz, particularly 9 MHz, particularly less than 2 MHz, and/or less than 5%, particularly less than 2%, of the lower frequency. The frequencies, particularly those of the frequency hopping, lie particularly in a span from 25 to 100 MHz, in particular they completely span such a span. The frequencies, particularly those of the frequency hopping, lie particularly in the range from 2 to 6 GHz. A spacing in the range from 0.1 to 10 MHz, particularly in the range from 0.5 to 10 MHz, lies particularly between adjacent but not necessarily consecutive frequencies, particularly of the frequency hopping. The frequencies between which a change in the phase shift is calculated have a spacing particularly in the range from 0.1 to 10 MHz, particularly in the range from 0.5 to 10 MHz, particularly to 2 MHz.

Adjacent frequencies are, in particular, the frequencies lying next to one another in the plurality of different frequencies, particularly those lying next to one another, which were sent by one of the objects, preferably they are similar.

The scaled phase shift change values collected thereby are preferably used for determining the phase of the complex number at the respective frequency (that belongs to the value proportional to the amplitude) and/or the phase values at the respective frequency, particularly by approximate integration via the frequency and/or weighted summing via the frequency. When f=0 Hz, it is not necessary to begin with the integration or summing, but rather it is possible and preferred for an offset common to all complex numbers or phase values to be used, particularly the lowest frequency of the plurality, particularly the selected plurality, of different frequencies.

The phase value is thus determined particularly from the signal time-of-flight or signal round-trip time.

In particular, the phase shift change (dPhase shift (fb,fa)) is obtained by using the formula:

$$\text{dPhase shift}(fb,fa)=k1*RTT(fm)*\text{dFrequency}(fb,fa)$$

or $$\text{dPhase shift}(fb,fa)=k2*STT(fm)*\text{dFrequency}(fb,fa)$$

Where dFrequency(fb,fa) is the difference between the frequencies fb and fa, RTT(fm) is double the signal time-of-flight or is the signal round-trip time, and STT(fm) is half of the signal time-of-flight or half of the signal round-trip time between the first and second object at one or more frequencies fm, similar to fb and/or fa, and/or vice versa, and wherein k1, k2 is in each case a constant, particularly equal to Pi, and k2 is equal to 2Pi.

f(m) is the frequency at which the time-of-flight measurement was carried out, fb and fa are two frequencies selected such that fb does not equal fa, and fb is similar to fa and fm. In particular, fb is greater than fa, and/or fa is less than fm, and/or fb is greater than fm. It is not necessary that measurements be performed for fb and fa. They or better yet, the change in phase shift expected between them, are constructed from the measurement of fm using the above formula.

In particular, the complex value Z is calculated for a frequency, using:

Absolute value(Z(f))=(k3*Amplitude(fm)+offset), with f being similar to fm, and with a spacing to fm that is as low as possible, and preferably consistently greater or less than fm to the greatest extent possible, or as a mean of amplitudes at adjacent and/or similar frequencies $$\text{Argument}(Z(f))=\text{sum}(\text{dPhase shift}(f(n+1),fn))\text{ using } fn \text{ from } f0 \text{ to } f(n+1)=f.$$

with offset of a constant, particularly equal to 0 and/or k3 of a constant, particularly equal to 1.

Thus the changes of the phase shift are summed, from the lowest frequency to the frequency in question, for which the complex number is to be determined. The lowest frequency is approximately equal for all complex numbers, in particular, it is identical. Moreover, the phase shift changes are, in particular, always to be summed for consecutive frequency pairs, in which the higher frequency is approximately equal, in particular, is identical, to the lower of the frequencies of the next pair, thus in particular $$\text{dPhase shift}(f1,f0)+\text{dPhase shift}(f2,f1)+\text{dPhase shift}(f3,f2)+\ldots+\text{dPhase shift}(f,fn)$$

where f=f(n+1)

F0 is approximately equal, in particular is equal, for all complex numbers of a vector and/or of a matrix.

The closer the steps of the real measurement, i.e., of the available fm, the smaller the step size that can be selected in the sequence f0 to f, and therefore, the more accurate the method is.

For example, if measuring is done as follows

| | |
|---|---|
| F1 | STT1 (STT = signal time-of-flight) |
| F2 | STT2 |
| F3 | STT3 |
| F4 | STT4 |
| Fn | STTn |

And if the spacing between the adjacent frequencies is equidistant to the spacing 2d, then F1+2*d=F2, F2+2*d=F3, etc. Then one can form:

$$\text{dPhase shift}(F1+d,F1-d)=k1*2*STT(F1)*2d,\text{generally}$$

$$\text{dPhase shift}(Fn+d,Fn-d)=k1*2*STT(Fn)*2\text{d},$$

Then, for example, one forms $$\text{Amount}(Z(fn+d))=(k3*\text{Amplitude}(Fn)+\text{offset})\text{ and}$$

$$\mathrm{Argument}(Z(fn+d))=\mathrm{Sum}(\mathrm{dPhase\ Shift}(fs+d,fs-d))\ via\ fs \text{ from}$$

F1 to Fn

If the spacings are not equidistant, then one selects as the frequencies fa and fb, particularly as the lowest, a frequency that lies particularly just under the lowest measurement frequency, and then after that, frequencies that lie between, particularly in the middle, of the increasing measurement frequencies. In particular, k1 is constantly equal to pi, and/or in particular k3 is equal to 1, and/or in particular offset is equal to 1.

In particular, the constants are identical for the calculation of all complex numbers of a vector or of a matrix.

The complex numbers are constructed particularly for constructing a complex vector, which is constructed particularly from the complex numbers as a row or column value. In particular, an autocorrelation matrix is then created from the complex vector. This autocorrelation matrix may then be used for known methods of distance determination which are based on such an autocorrelation matrix, such as CAPON, MUSIC, or virtual distance calculation to emission or reception characteristics, in particular groups of matrices.

As described above, the phase shift changes are thus summed, namely from the lowest frequency, or an established starting frequency, up to the frequency in question for which the complex number or the phase value that is equal to the argument of the complex number is to be determined.

In particular, a matrix, particularly an autocorrelation matrix, is constructed from a plurality of the complex numbers, and the distance is determined by means of this autocorrelation matrix and by means of methods, particularly known ones, such as MUSIC, CAPON, comparison with, distance calculation to, and/or projection onto, emitting and/or receiving characteristics. Advantageously, the distance calculation occurs by means of eigenvalue, or eigenvector determination, of the at least one matrix and/or Fourier transformation of the complex values.

Such approaches are advantageous for achieving a reliable determination, particularly with multipath signal propagation.

The calculation can be illustrated by way of example, as follows:

All signal round-trip times or doubled signal times-of-flight (RTT) are in each case converted into a phase shift, and then phase shift differences or phase shift derivations are determined for pairs of phase shifts:

$$\mathrm{dPhase\ shift}(f1,f2)=2Pi*(2*\mathrm{distance})*\mathrm{dFrequency}(f1,f2)/c\quad RTT=2*\mathrm{distance}/c$$

$$\mathrm{dPhase\ shift}(f1,f2)=2Pi*(RTT*c)*\mathrm{dFrequency}(f1,f2)/c$$

dPhase shift is a phase shift difference between two frequencies f1 and f2, which have the spacing dFrequency. c is the speed of light.

Then, the calculated phase shift differences are summed: sumPh(Fn)=sum of dPh(F0 . . . Fn), in order to obtain the phase values.

F0 to Fn are the multiple different frequencies.

These summed phase shift differences, with the associated amplitudes determined upon reception, can then be input as complex values into a Fourier transformation, or a spectral estimate can be performed with them using super-resolution methods in matrices (e.g., MUSIC or CAPON). The spectrum is then the spectrum on various wide paths that the signal travels before it arrives superimposed at the receiving antenna. Particularly here, it is particularly advantageous to use multiple antenna paths for the transmission and to include them in the evaluation.

In principle, it is also preferred that multiple, particularly three, preferably at least four, different antenna paths, are used for the radio signal time-of-flight measurements. An antenna path is distinguished by the antennas used for transmitting and for receiving. For example, when a first antenna on the first object is used for transmitting, and a second antenna on the second object is used for receiving, this is a first antenna path. If the antenna on the first object used for transmission is then changed to a third antenna on the first object, then another, second, antenna path is used. Advantageously, the radio signal time-of-flight measurements are carried out on the first and/or second object, particularly successively, using different antennas.

DETAILED DESCRIPTION

The described method begins with transmitting radio signals from Object A to Object B at frequencies f0 to fn. The frequencies are changed between phase-coherently without phase jump. At the receiver as well, the frequencies are changed between phase-coherently without phase jump.

Time-of-flight and amplitude measurements are performed on the received radio signals at Object B. Equivalent phase shifts are calculated from the times-of-flight, or phase shift changes are calculated by means of these or directly, by means of $$\mathrm{dPhase\ shift}(f1,f2)=Pi*(RTT(f3)*c)*\mathrm{dFrequency}(f1,f2)/c.$$

dPhase shift is a phase shift difference between two frequencies f1 and f2, which have the spacing dFrequency. c is the speed of light and RTT is the doubled signal time-of-flight at the frequency fe, similar to f1 and/or f2.

On this basis, the phases phi are calculated for all f0 to fn, using $$phi(f0)=0$$

and $$phi(fc)=\mathrm{Sum}(phi(f0)\text{ to }phi(fc-1))+\mathrm{dPhase\ shift}(fc-1,fc)$$

From this, complex numbers Z(f0) to Z(fn) are obtained with $$\mathrm{Amount}(Z(fd))=A(fd)$$

and $$\mathrm{Argument}(Z(fd))=phi(fd)$$

Figure 1:
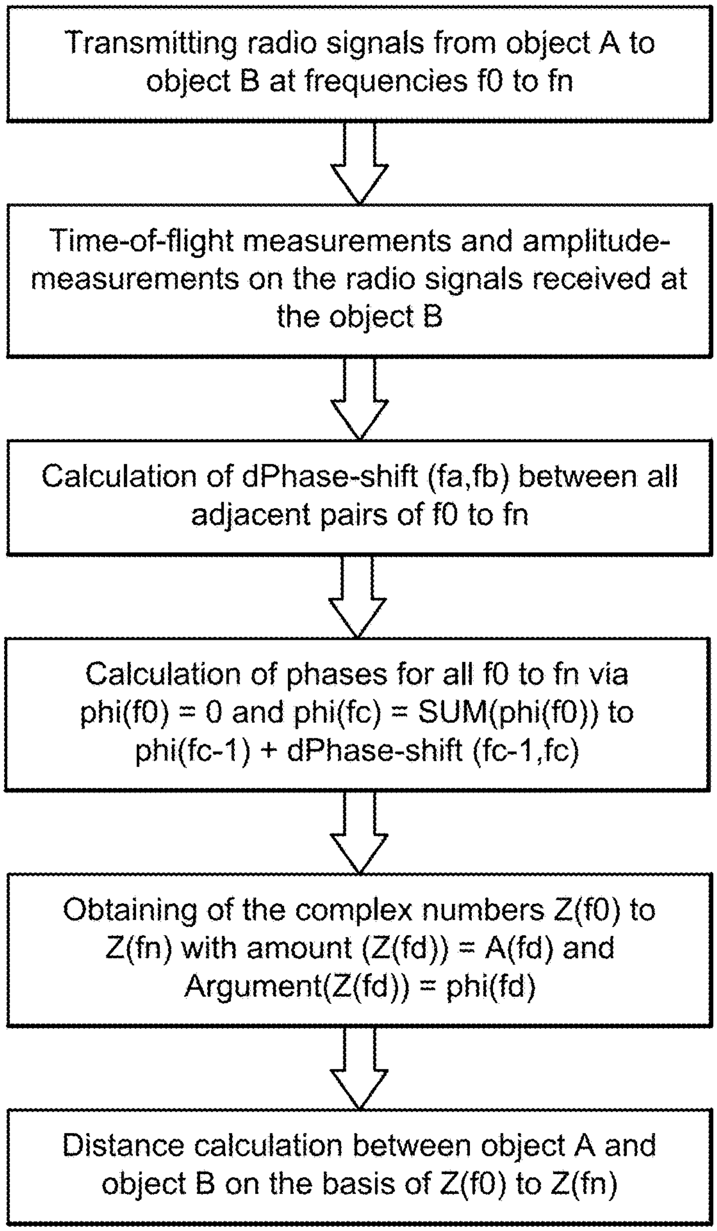
FIG. 1 shows purely schematically, by way of example and in a non-limiting manner, a possible embodiment of the method according to the invention.
Figure 2:
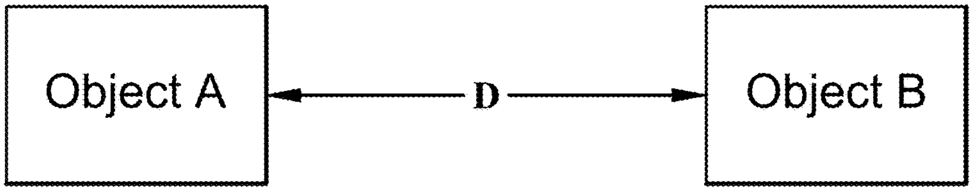
FIG. 2 schematically shows an object A and an object B, separated by a distance D, as measured per an embodiment of the present disclosure.

Next, the distance D between Object A and B is calculated on the basis of Z(f0) to Z(fn), wherein the distance D separating Object A and Object B is schematically shown in FIG. 2.

The invention claimed is:

1. A method for determining a distance between two objects based on a plurality of radio signal time-of-flight measurements performed between the two objects at a plurality of different frequencies, the method comprising the steps of:

transmitting the plurality of radio-signals at the plurality of different frequencies via a first object of the two objects;

receiving the plurality of radio-signals transmitted by the first object at the plurality of different frequencies via a second object of the two objects;

performing signal time-of-flight measurements on the received plurality of radio-signals at the plurality of different frequencies and determining radio-signal time-of-flights at the plurality of different frequencies from the signal time-of-flight measurements;

deriving phase shift changes between two frequencies of the plurality of frequencies using the radio-signal time-of-flights determined for the two frequencies, wherein the two frequencies have a frequency spacing between their frequencies, wherein the phase shift change is scaled to the frequency spacing;

determining i) phase values for the plurality of different frequencies or ii) arguments of complex numbers for the plurality of different frequencies from the phase shift changes derived from the radio-signal time-of-flights; and calculating the distance between the two objects based on the phase values or complex numbers determined.

2. The method according to claim 1, wherein amplitude or power measurements on the plurality of different frequencies are performed for the plurality of radio signal time-of-flight measurements, wherein a number that is proportional to the amplitude or power is used as the amplitude or amount of the complex number for calculating the distance between the two objects.

3. The method according to claim 2, wherein a vector or an autocorrelation matrix is constructed from the complex numbers, wherein the distance between the two objects is calculated from the vector or the autocorrelation matrix, respectively.

4. The method according to claim 1, wherein the phase value or the argument of the complex numbers at a first frequency is determined by summing up all phase shift changes derived for frequencies up to the first frequency.

5. The method according to claim 1, wherein a plurality of different antenna paths is used for transmitting the radio signals.

6. The method according to claim 1, comprising phase-coherent switching between at least two of the plurality of different frequencies.

7. The method according to claim 1, wherein the first object emits the radio signals at the plurality of frequencies successively or consecutively.

8. The method according to claim 1, wherein at least one time- or clock-cycle- or time drift-synchronization or correction is carried out between the two objects before, after or while transmitting the plurality of radio-signals.

9. The method according to claim 1, wherein the frequency spacing between two consecutive frequencies of the plurality of different frequencies is at least 0.1 MHz or a maximum of 10 MHz, or wherein the plurality of different frequencies span a frequency band of at least 2 MHz or a maximum of 100 MHz.

10. The method according to claim 1, wherein a time drift of at least one of the two objects is determined or corrected or is used for calculating the distance.

11. The method according to claim 1, wherein radio signals received at a second object with a received power below a predetermined or calculated lower power limit are not used for determining the distance, and wherein radio signals received at the second object with a power above a predetermined or calculated upper power limit are not used for determining the distance.

12. The method according to claim 1, carried out between a plurality of pairs of objects, wherein one object of each pair is an object that is involved in all pairs, and wherein ascertained distances of the pairs are used to carry out a mapping or position determination.

13. The method according to claim 1, wherein the second object does not send any signals for determining the distance, or the second object only sends signals for time- or clock-cycle-synchronization.

* * * * *